United States Patent
Adamczyk et al.

(10) Patent No.: US 7,328,029 B1
(45) Date of Patent: *Feb. 5, 2008

(54) SYSTEMS AND METHODS FOR MONITORING AND NOTIFICATION OF MEETING PARTICIPANT LOCATION

(75) Inventors: Maria Adamczyk, Alpharetta, GA (US); Hong Thi Nguyen, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 437 days.

This patent is subject to a terminal disclaimer.

(21) Appl. No.: 10/179,441

(22) Filed: Jun. 24, 2002

(51) Int. Cl.
*H04B 7/00* (2006.01)

(52) U.S. Cl. .............. 455/456.3; 455/456.5; 709/206

(58) Field of Classification Search .......... 455/456.3, 455/456.5, 414.2, 414.3, 456.2, 456.6; 342/357.1, 342/357.07, 357.09, 357.03; 709/206, 203; 705/9
See application file for complete search history.

(56) References Cited

U.S. PATENT DOCUMENTS

| | | | |
|---|---|---|---|
| 5,266,944 A | 11/1993 | Carroll et al. ......... 340/825.36 |
| 5,701,301 A | 12/1997 | Weisser, Jr. ................ 370/428 |
| 6,204,772 B1 | 3/2001 | DeMay et al. ........... 340/686.1 |
| 6,360,101 B1* | 3/2002 | Irvin ....................... 455/456.6 |
| 6,374,176 B1 | 4/2002 | Schmier et al. ............ 701/200 |
| 6,424,910 B1 | 7/2002 | Ohler et al. ............... 701/202 |
| 6,441,778 B1* | 8/2002 | Durst et al. ........... 342/357.07 |
| 6,677,894 B2* | 1/2004 | Sheynblat et al. ....... 342/357.1 |
| 2002/0152273 A1* | 10/2002 | Pradhan et al. ............ 709/206 |
| 2004/0039527 A1* | 2/2004 | McDonald et al. ......... 701/213 |
| 2007/0055561 A1* | 3/2007 | Perrella et al. ................ 705/9 |

\* cited by examiner

*Primary Examiner*—Joseph Feild
*Assistant Examiner*—Phuoc Doan
(74) *Attorney, Agent, or Firm*—Cantor Colburn LLP

(57) ABSTRACT

Systems and methods for notifying a user that a meeting participant is within a specified distance of a meeting location are disclosed. A method according to the invention includes receiving a location signal that represents a current location of a meeting participant, storing meeting location data that represents a meeting location and distance data that represents a specified distance from the meeting location, determining from the location signal, the meeting location data, and the distance data whether the current location of the meeting participant is within the specified distance from the meeting location, and transmitting a notification message if the current location of the meeting participant is within the specified distance from the meeting location.

14 Claims, 7 Drawing Sheets

SYSTEMS AND METHODS FOR MONITORING AND NOTIFICATION OF MEETING PARTICIPANT LOCATION

CROSS-REFERENCE TO RELATED APPLICATIONS

The subject matter disclosed herein is related to the subject matter disclosed in U.S. patent application Ser. No. 10/179,815, filed on Jun. 24, 2002, even date herewith and entitled "Systems And Methods For Providing Notification Of A Location Of A Restrained Party." The subject matter disclosed herein is related to the subject matter disclosed in U.S. Pat. No. 6,774,840, filed on Jun. 24, 2002 and entitled "Systems And Methods For Providing Location-Based Arrival Monitoring And Notification." The disclosure of each of the above references is hereby incorporated by reference.

FIELD OF THE INVENTION

This invention relates to communication and location systems. More particularly, the invention relates to systems and methods for notification that a meeting participant is within a specified distance of a specified meeting location.

BACKGROUND OF THE INVENTION

Unfortunately, punctual meeting participants all too frequently have to wait patiently for latecomers to arrive at a meeting location. This is not only a source of frustration for the punctual meeting participant, but the time that the punctual meeting participant spends waiting for latecomers to arrive could usually be put to better use. Similarly, under some circumstances, a meeting participant might not be able to commit to arriving at the meeting location at a specific time. Under such circumstances, the other meeting participants might not want to gather at the meeting location until they are sure that the uncertain participant is going to arrive shortly. If a meeting participant is running late, he or she might be inclined to rush to get to the meeting, only to learn that other participants are running late as well.

In each of these scenarios, one or more of the meeting participants might like to know whether or not the other meeting participants are at or near the meeting location. For example, if the punctual meeting participant knew that the other meeting participants were not yet at the meeting location, then the punctual meeting participant could wait until the other participants were about to arrive before going to the meeting location himself. If the other meeting participants knew that the uncertain arrival was just about to arrive at the meeting location, then they could make their way to the meeting themselves. Similarly, the meeting participant who is running late could determine whether to take his time, rush to the meeting, call the meeting location to announce that he will be late, etc.

It would be advantageous, therefore, if systems and methods were available to monitor the current location of one or more meeting participants, and provide notification that one or more meeting participants are within a specified distance of the meeting location.

BRIEF SUMMARY OF THE INVENTION

The invention provides systems and methods for notifying a user that one or more meeting participants is within a specified distance of a specified meeting location. According to the invention, the global positioning system ("GPS") can be used in conjunction with wireless phone technology to enable automatic tracking of the respective locations of the meeting participants. The user can provide the service, via a telephone or web-based interface, for example, with the respective identities of the meeting participants, the meeting location, and a distance from the meeting location. The user can initiate participant monitoring by dialing a pre-arranged telephone number and activating the service. The service then monitors the respective location of each of the meeting participants. When a given participant is within the specified distance from the meeting place, the service notifies one or more user-specified contacts.

A system according to the invention can include a data store that contains identity data that represents a respective identity of each of one or more meeting participants, location data that represents a specified meeting location, and distance data that represents a specified distance from the meeting location. Receiving means is provided for receiving respective location signals that represent respective current locations of respective meeting participants. The system includes determination means for determining from the location signals, the location data, and the distance data, whether the current location of any of the meeting participants is within the specified distance from the specified meeting location. Transmission means is provided for transmitting a notification if the current location of any of the meeting participants is within the specified distance from the specified meeting location. The system can also include a user interface via which a user can provide input data such as the identity data, the location data, the distance data, and the contacts data.

BRIEF DESCRIPTION OF THE SEVERAL VIEWS OF THE DRAWING

Other features of the invention are further apparent from the following detailed description of the embodiments of the present invention taken in conjunction with the accompanying drawing, of which.

DETAILED DESCRIPTION OF THE INVENTION

Figure 1:
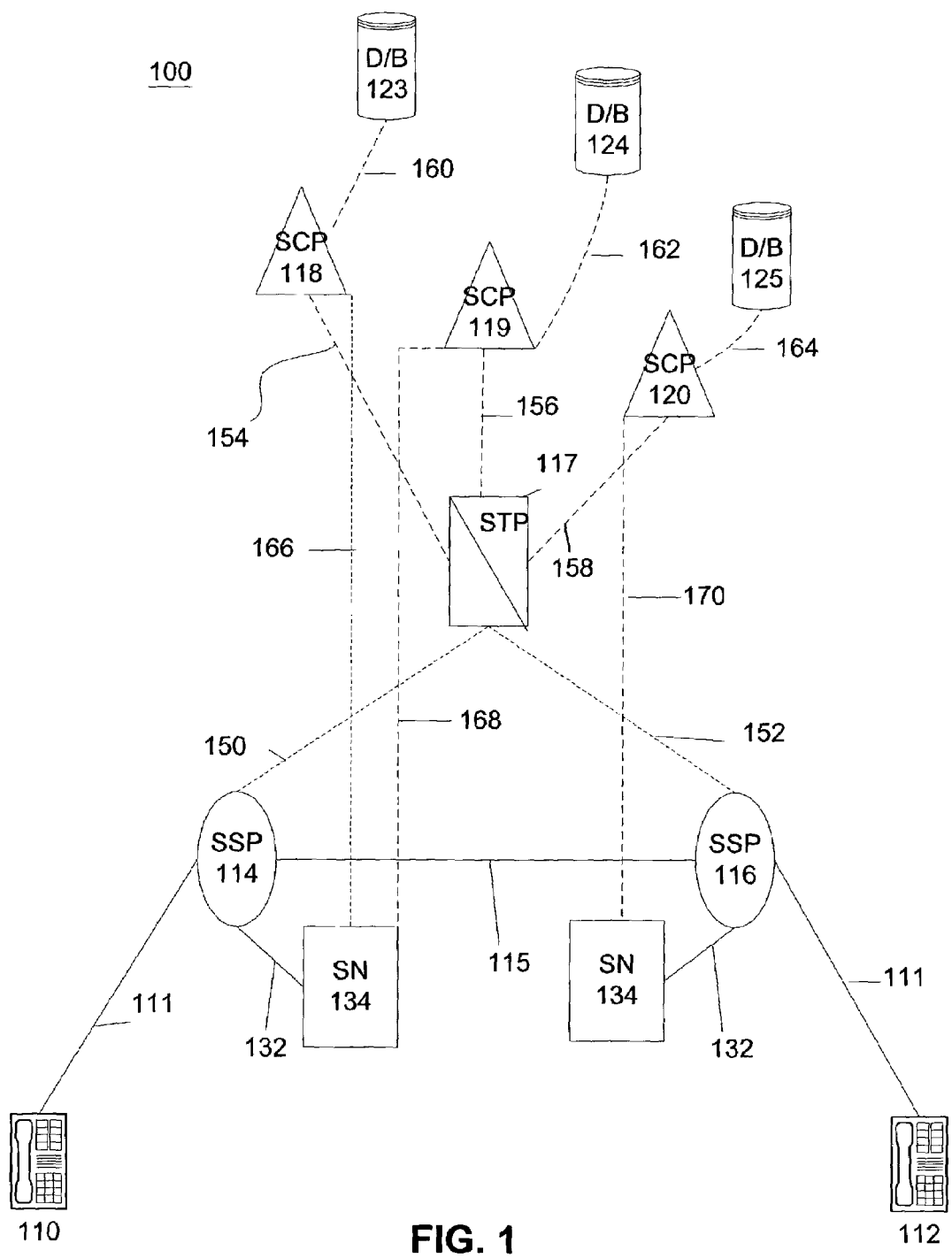
FIG. 1 is a block diagram of an exemplary telecommunication network in which the principles of the invention can be employed.

FIG. 1 is a block diagram of an exemplary telecommunication network 100, such as a public switched telecommunications network (PSTN), in which the principles of the invention can be employed. More particularly, FIG. 1 illustrates a simplified advanced intelligent network (AIN). AIN systems are described in U.S. Pat. No. 5,701,301, the disclosure of which is hereby incorporated herein by reference. Though the various features and aspects of the invention can be utilized in conjunction with an AIN, it should be understood that the invention is not limited to AIN-based systems, and that other networks and system arrangements can be used in accordance with the invention.

As shown, the AIN 100 can include a plurality of service switching points (SSPs) 114, 116. SSPs 114, 116 are capable of generating AIN queries. An SSP, which is also known as a "central office," is basically a switch and the terms are used interchangeably herein. SSPs 114 and 116 can comprise, for example, DMS100 or 5ESS switches. These switches can be manufactured by, for example, Lucent Technologies, Inc. or Nortel Networks.

Each of the SSPs 114, 116 can have one or more subscriber lines 111 connected thereto. Subscriber lines 111 may also be referred to as calling lines. Each SSP 114, 116 serves a designated group of calling lines 111, and thus, the SSP that serves a particular calling line may be referred to as its serving switch. Typically, each calling line 111 is connected to one or more pieces of terminating equipment 110, 112, such as a telephones, facsimile machines, computers, modems, or other such telecommunication devices.

SSPs 114, 116 are interconnected by one or more trunk circuits 115. Trunks 115 are basically the voice paths via which communications are connected between SSPs. The term "communication" or "call" is used herein to include all messages that may be exchanged between the calling party and the called party in a telecommunication network, such as illustrated in FIG. 1. Trunk 115 can be either a Signaling System 7 (SS7) controlled multi-frequency (MF) trunk, or primary rate interface (PRI) trunk or the like. The type of trunk will be in accordance with both the sending and receiving SSP to which it is connected.

Each SSP 114, 116 can include different types of facilities and/or triggers. SSPs 114 and 116 are programmable switches that can perform some or all of the following functions: recognize AIN-type calls, launch queries, and receive commands and data to further process and route AIN-type calls. When one of SSPs 114 or 116 is triggered by an AIN-type call, the triggered SSP 114 or 116 formulates and sends an AIN query. Based on the reply from the AIN network, SSP 114 or 116 responds to call processing instructions received.

Each of SSPs 114 and 116 is connected to a signal transfer point (STP) 117 via respective data links 150, 152. Data links 150, 152 can employ SS7, for example, though it should be understood that any suitable signaling protocol could be employed. To facilitate signaling and data messaging, each SSP 114 and 116 can be equipped with Common Channel Signaling (CCS) capabilities, e.g., SS7, which provides two-way communications of data messages over CCS links 150 and 152 between components of the AIN network. The data messages can be formatted in accordance with the Transaction Capabilities Applications Part (TCAP). Alternatively, Integrated Service Digital Network (ISDN) Users Part (ISUP) can be used for signaling purposes between, for example, SSPs 114 and 116. In such a case, SSPs 114 and 116 can be equipped with the capability to map appropriate data between TCAP and ISUP protocols, and vice versa. The telephone network basically employs an upper-level software controlled network through the STPs and the SCP.

SSPs 114 and 116 may allow normal switch processing to be suspended at specific points in a call so that the switch can send an AIN message query via signaling transfer point (STP) 117 to SCP 118, 119 or 120. SCP 118, 119 or 120 may execute software based service logic and return call-processing instructions to the triggering AIN SSP. New services may be provisioned by assigning AIN SSP triggers to customer lines, trunks, and/or NANP (North American Numbering Plan) telephone numbers.

Much of the intelligence of the AIN resides in a type of AIN element referred to as a service control point (SCP) 118, 119, 120 that is connected to STP 117 over an SS7 data link, or the like, 154, 156 or 158. Accordingly, the connections by links 150, 152, 154, 156, and 158 are for signaling purposes and allow SSPs 114 and 116 to send messages to, and receive messages from, SCP 118, 119 and 120.

Among the functions performed by SCP 118, 119, 120 is the hosting of network databases and subscriber databases, which may be stored in respective data storage objects 123, 124, 125. For example, data storage object 123 is shown as a database communicatively coupled via respective communication paths 160, 162, 164 to SCP 118, although data storage object 123 can be embodied as a component within SCP 118, such as an internally-mounted hard disk device. The databases stored in data storage object 123 may be used in providing telecommunications services to a customer. Typically, SCP 118, 119, 120 is also the repository of service package applications (SPAs) that are used in the application of telecommunication services, enhanced features, or subscriber services to calling lines. Additionally, SPAs may use databases for providing telecommunication services.

A set of triggers can be defined at the SSPs 114, 116. A trigger in the AIN is an event associated with a particular call that initiates a query to be sent to SCP 118, 119, or 120. The trigger causes selected SCP 118, 119, or 120 to access, if necessary, its respective database 123, 124, or 125 for processing instructions with respect to the particular call. The results of the SCP processing and/or database inquiry is/are sent back to selected SSP 114 or 116 in a response through STP 117. The return packet includes instructions to SSP 114, 116 as to how to process the call. The instructions may be to take some special action as a result of a customized calling service, enhanced feature, or subscriber service. In response, switch 114, 116 moves through its call states, collects the called digits, and generates further packets that are used to set up and route calls. Similar devices for routing calls among various local exchange carriers are provided by regional STP and regional SCP.

An example of such a trigger is a termination attempt trigger (TAT), which causes a query to be sent to SCP 118, 119, or 120 whenever an attempt is made to terminate a call on the line of subscriber 110 or 112. Another type of trigger that may be used is a Public Office Dialing Plan (PODP) trigger, though it should be understood that the principles of the invention include the use of other triggers.

The AIN can also include a services circuit node 134 (SCN), which may also be referred to herein as a services node (SN). SN 134 is an interactive data system that acts as a switch to transfer calls. SN 134 may provide interactive help, collect voice information from participants in a call, and/or provide notification functions. SN 134 can be a Lucent Technologies Star Server FT Model 3200 or Model 3300 although other such devices can be employed. SN 134 can include voice and dual tone multi-frequency (DTMF) signal recognition devices and/or voice synthesis devices. In addition, SN 134 can include a data assembly interface. SN 134 can be connected to local SCP 118, 119, 120 via respective data links 166, 168, 170 using an X.25, SS7 or TCP/IP protocol or any other suitable protocol. In addition, SN 134 typically may be connected to one or more (but usually only a few) SSPs via Integrated Service Digital Network (ISDN) lines or any other kind of suitable telephone lines 132.

One skilled in the art will further recognize that the above-described network is a simplified network meant for explanatory purposes. It is likely that a telephone network might include numerous user stations, SSPs, STPs, SCPs, and SNs along with other telephone network elements, and can employ other types of triggers without departing from the spirit and scope of the invention.

Figure 2:
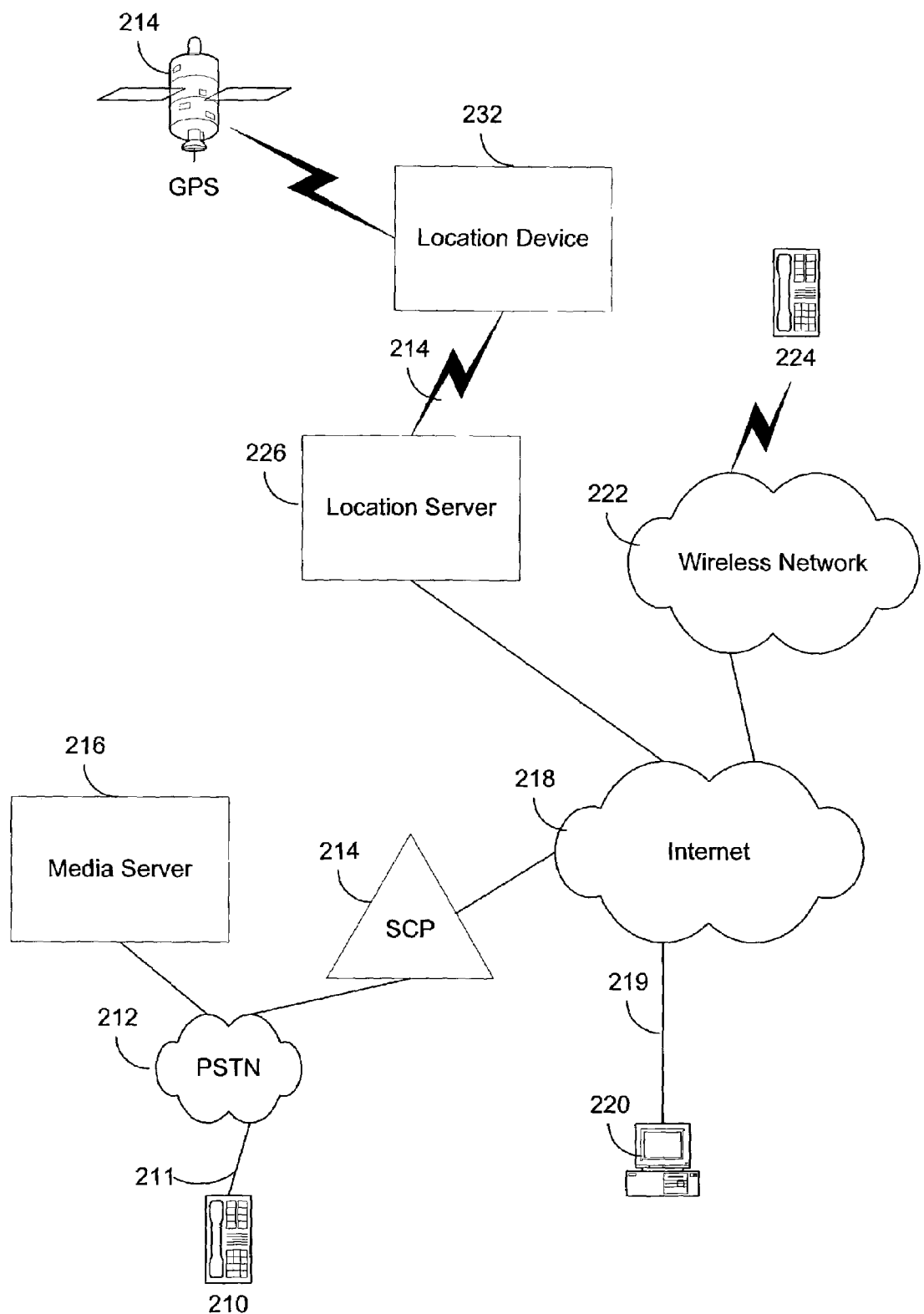
FIG. 2 is a block diagram of a preferred embodiment of a system according to the invention.

FIG. 2 is a block diagram of a preferred embodiment of system according to the invention for monitoring and notification of meeting participant location. For illustration purposes, as seen in FIG. 2, the present invention can be embodied in a signal control point ("SCP") 214 of an AIN-based telephone system such as described above. The SCP 214 can include a computer-readable medium having computer-executable instructions thereon for performing a method according to the invention. The present invention can be, however, implemented in other components of an AIN-based telephone network, or in any other telephone network or system. Consequently, the present invention should not be construed to be limited to AIN-based systems.

According to the invention, a user can use a telephone 210 to call into the notification service, which can be provided as an option in an existing telephone service or as a standalone service. The user's telephone 210 is connected to a PSTN 212 via a calling line 211. The PSTN 212 directs the call to the SCP 214, which performs the main processing (described below) for the notification service.

Alternatively, the user can connect to the notification service via the Internet 218, or any other local or wide area communications network, such as a proprietary intranet, for example. The user, via a browser executing on the user's client device 220, can access a web site provided by the notification service. The client device 220 can be a desktop or laptop computer, a personal digital assistant, or any other such Internet appliance. The SCP 214 can be coupled to the network 218 via a communication link 219. Thus, a user can access the notification service via a telephone connection or network connection.

A location server 226 can be coupled to the communication network 218 to provide location data to the notification service. The notification service can poll the location server, for example, to retrieve data that represents the current location of one or more of the specified meeting participants.

In a preferred embodiment of the invention, each specified meeting participant can wear or carry a respective location device 232 that transmits to the location server 226 location signals 214 that represent the current location of the meeting participant. Preferably, the location device 232 includes a GPS receiver that receives GPS signals from a plurality of GPS satellites, and retransmits the GPS signals to the location server 226. The location server 226 can then compute the current location of the meeting participant from the GPS signals. Alternatively, the location device 232 can be a simplex device that transmits a signal train (i.e., a series of pulses) to the location server 226. The location server 226 can compute the current location of the meeting participant from the received signal train. In any event, the location server 226 determines the current location of each of the meeting participants, preferably in terms of the longitude and latitude associated the current geographic location of the meeting participant. The location server 226 can be an integral component of the notification service on the SCP 214, or it can be part of an outside service that provides the location data to the SCP 214.

A media server 216, as is well known in the art, can be coupled to the PSTN 212 to enable the notification service to initiate telephone calls, dispatch electronic mail, or otherwise establish communications with the user or other contacts that the user has set up to receive notifications that a meeting participant is within a specified distance of the meeting location. The notification service can initiate a telephone call, for example, by sending a call request to the media server 216. The media server 216 places the call and plays an audio message informing the contact that the meeting participant is within the specified distance of the meeting location. The message can include the approximate time at which the meeting participant moved to within the specified distance of the meeting location. The media server can be an integral component of the notification service on the SCP 214, or it can be part of an outside service that performs these functions for the notification service. A wireless network 222 enables the notification service to notify a contact via a wireless device 224, such as a mobile telephone, pager, PDA, or the like.

Figure 3:
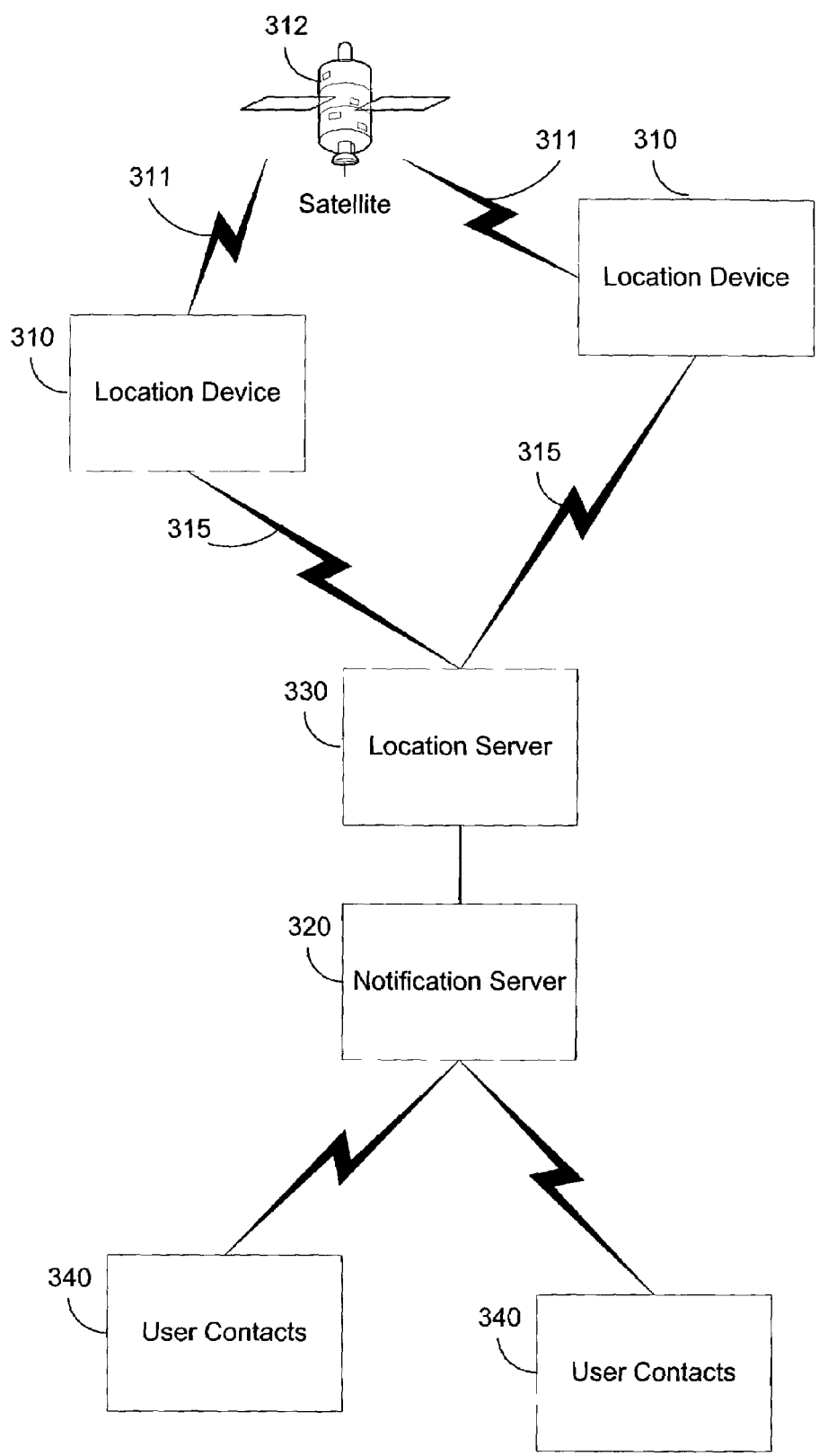
FIG. 3 is a functional block diagram of a preferred embodiment of a system according to the invention.

FIG. 3 is a functional block diagram of a system according to the invention for monitoring and notification of meeting participant location. Preferably, each meeting participant wears a respective location device 310 that includes a GPS receiver that receives global positioning signals 311 from each of a plurality of GPS satellites 312. The receiver computes the current longitude and latitude of the meeting participant from the global positioning signals 311, and transmits to the location server 330 a location signal 315 that includes the current longitude and latitude of the location of the meeting participant. Alternatively, the location device 310 could provide the location signals 315 to the location server 330 by merely forwarding the global positioning signals to the location server 330. In this case, the location server 330 could determine the current longitude and latitude of the location of the meeting participant from the global positioning signals. As shown, any number of location devices 310 can be communicatively coupled to the location server 330. Also, it should be understood that the location server 330 could include a single computer, or any number of computers working in combination.

Periodically, the location server 330 passes to the notification server 320 current location data relating to the specified party. The notification server 320 could periodically "pull" the current location data from the location server 330, or the location server 330 could periodically "push" the location data to the notification server 320.

According to the invention, the notification server 320 maintains a contacts table (see FIG. 5) having an entry associated with each user of the service. As will be described in detail below, the contacts table can contain contact data associated with each of one or more contacts 340 specified by the user. If the notification service determines that the meeting participant is within the specified distance of the meeting location, then the notification service notifies the contacts 340. The contacts 340 can include the user or any other contacts that the user specifies for such notification. As shown, the notification server can provide notification to any number of contacts 340, associated with each of any number of users. Also, it should be understood that the notification server 320 could include a single computer, or any number of computers working in combination.

Figure 4:
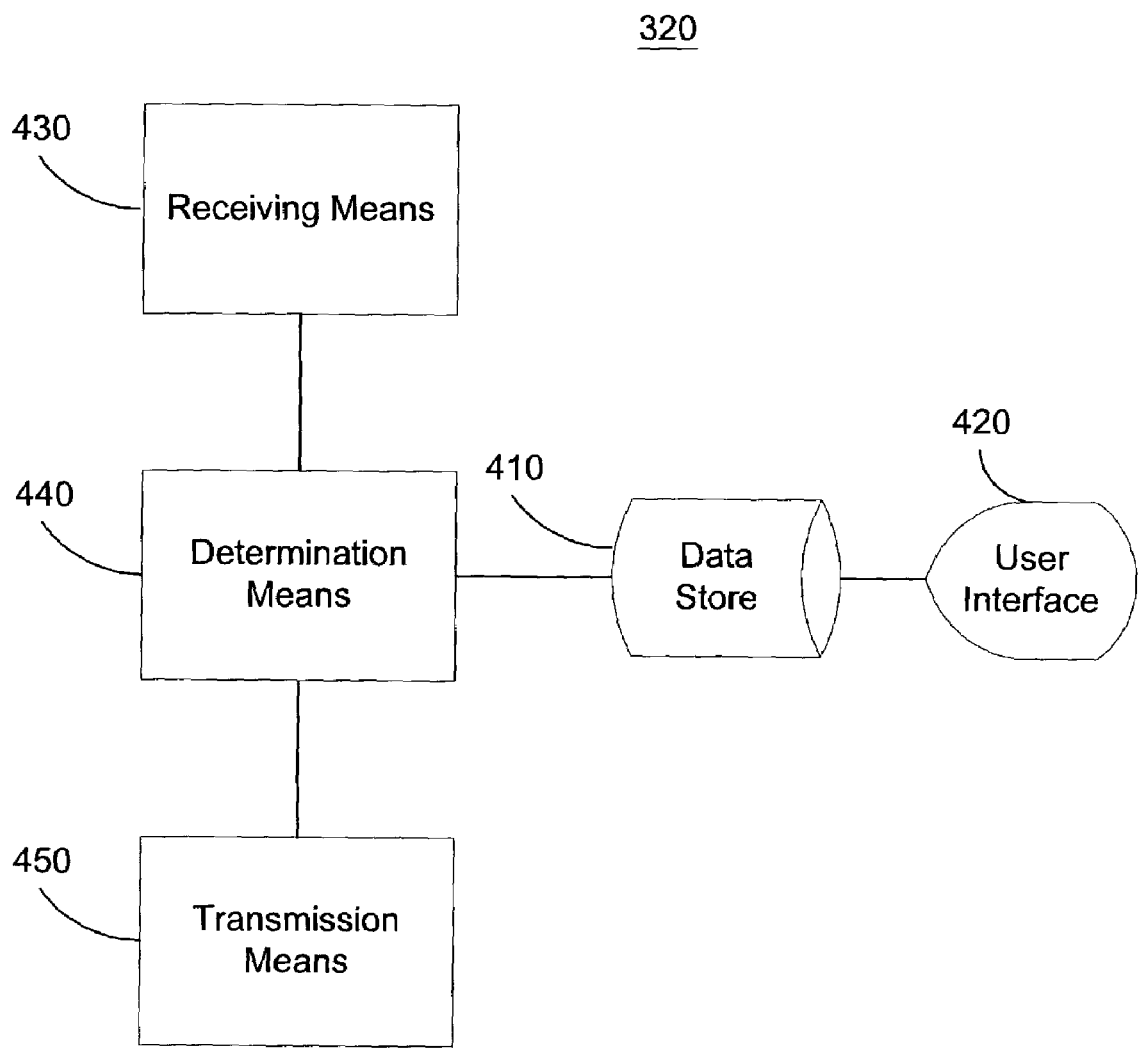
FIG. 4 is a block diagram of a notification server according to the invention.

FIG. 4 is a block diagram of a preferred embodiment of a notification server 320 according to the invention. As shown, the notification server 320 can include a data store 410 that contains respective identity data that represents a respective identity of each of the meeting participants, location data that represents the meeting location, and distance data that represents a specified distance from the meeting location. Preferably, the notification server 320 also includes a user interface 420 via which the user can communicate with the notification server 320 to provide data for storage in the data store 410.

According to the invention, the notification server 320 includes receiving means 430 for receiving respective location signals that represent the current locations of the meeting participants. The notification server 320 also includes determination means 440 that determines from the location signals and the location data whether a meeting participant has arrived at the meeting location. The notification server 320 includes transmission means 450 for transmitting a notification to each of the user specified contacts if the meeting participant arrives at the meeting location.

Figure 5:
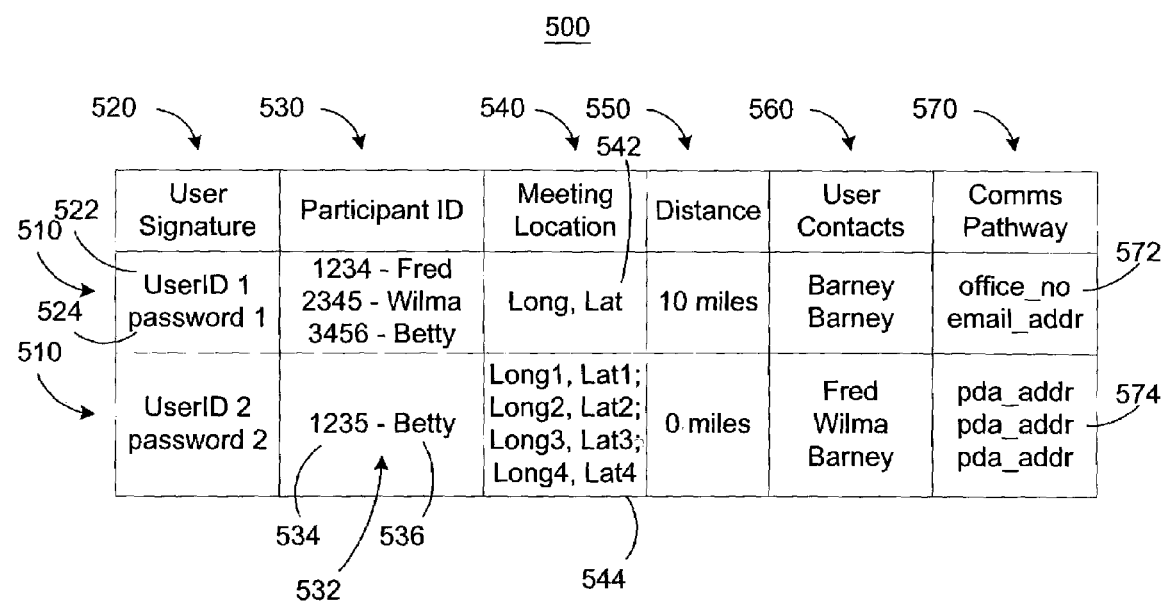
FIG. 5 depicts a preferred embodiment of a contacts table according to the invention.

Preferably, the data in the data store 410 is stored as a contacts table 500, such as depicted in FIG. 5. The contacts table 500 includes a respective entry 510 associated with each user of the notification service. Each such entry can include a user signature 520, which can include, for example, a user ID 522 and password 524 associated with the respective user.

Each entry 510 can also include a set 530 of participant IDs 532, each of which is associated with a respective meeting participant. A participant ID 532 can include an alphanumeric identifier 534 that is associated with the meeting participant (such as, an identifier that is associated with the meeting participant's location device), and a "friendly name" 536 that the user recognizes as being associated with the meeting participant.

Each entry 510 can also include a meeting location 540 that is associated with the set of meeting participants 530. Preferably, the meeting location is defined in the contacts table 500 by a longitude/latitude pair 542 associated with the geographic location where the meeting to take place. Alternatively, the meeting location 540 can be defined in the contacts table 500 by a set of longitudes and latitudes 544 that bound the location. Preferably, the user can input the location data as a street address. The system then converts the user input street address into the set of longitudes and latitudes that correspond to that street address, and stores the set of longitudes and latitudes 544 in the contacts table.

The contacts table 500 can also include a respective distance 550 associated with each meeting location 540. If the system determines that a specified meeting participant is within the specified distance 550 from the corresponding meeting location 540, then the system provides a notification to each contact 560 that the user has specified in the contacts table 500.

The contacts table 500 can also include one or more communications pathways 570 associated with each contact 560. If the system determines that a meeting participant is within the specified distance 550 from the corresponding meeting location 540, then the system provides a notification to each contact 560 via the communications pathway(s) 570 specified for that contact 560. A communications pathways 570 can be identified by a telephone number 572, for example, which indicates that a telephone call should be placed to notify the contact, or a network address 574, which indicates that an email message, for example, should be dispatched to the contact.

The data store 410 can also contain notification message data that corresponds to each communications pathway 570 (i.e., whether the communications pathway calls for a text message or an audio message). For example, if the communications pathway is by telephone, then an audio message can be stored in the data store, and played when the phone call is answered. A message such as "This is the notification service. Please be advised that Fred has arrived at the meeting location." can be played to a user of the service. A similar text message can also be stored in the data store for use where the communications pathway indicates that an email should be sent, for example, or where the telephone number corresponds to a pager or other Internet appliance that includes an electronic text display.

Figure 6A:
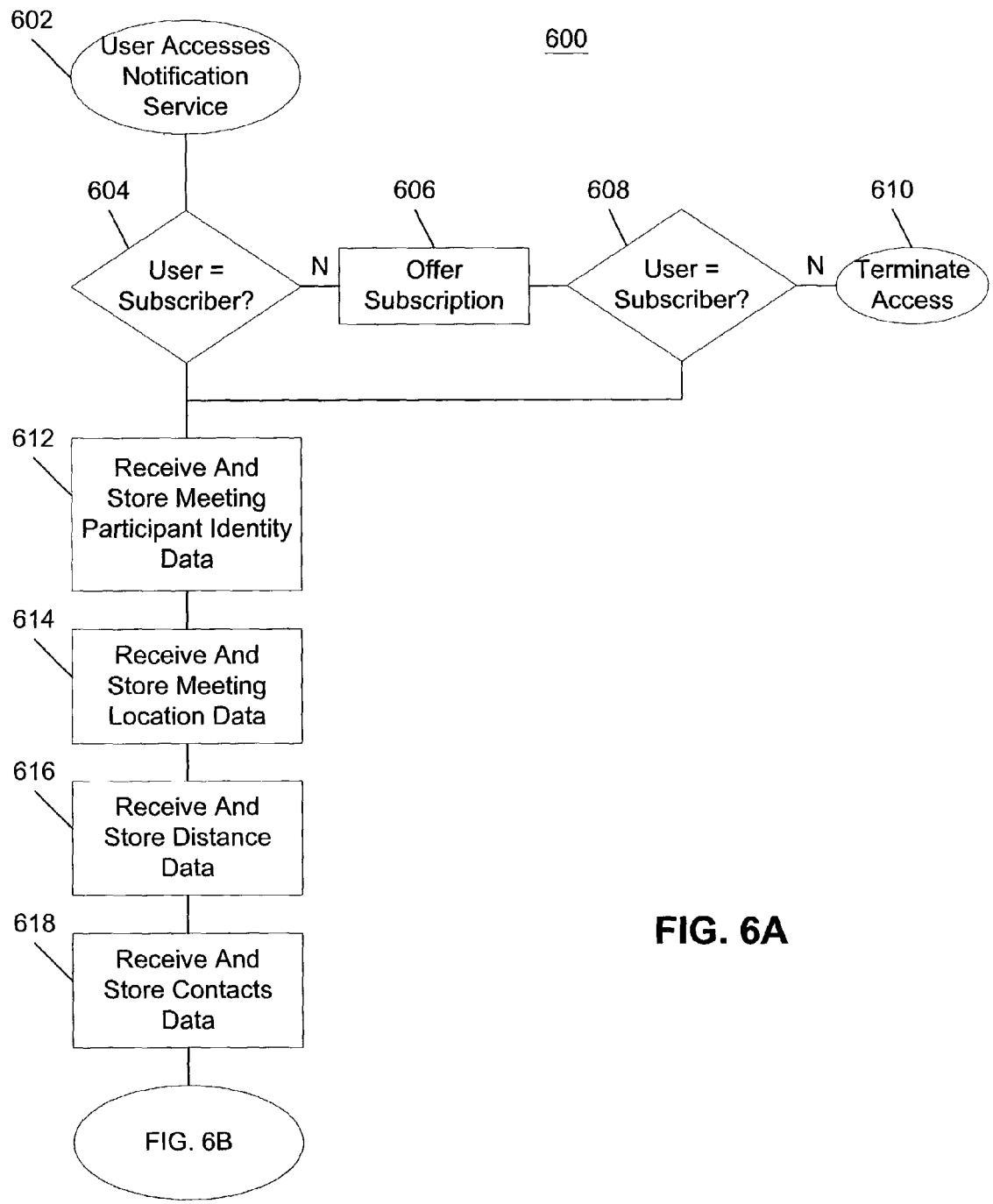
FIGS. 6A and 6B provide a flowchart of a preferred embodiment of a method according to the invention.
Figure 6B:
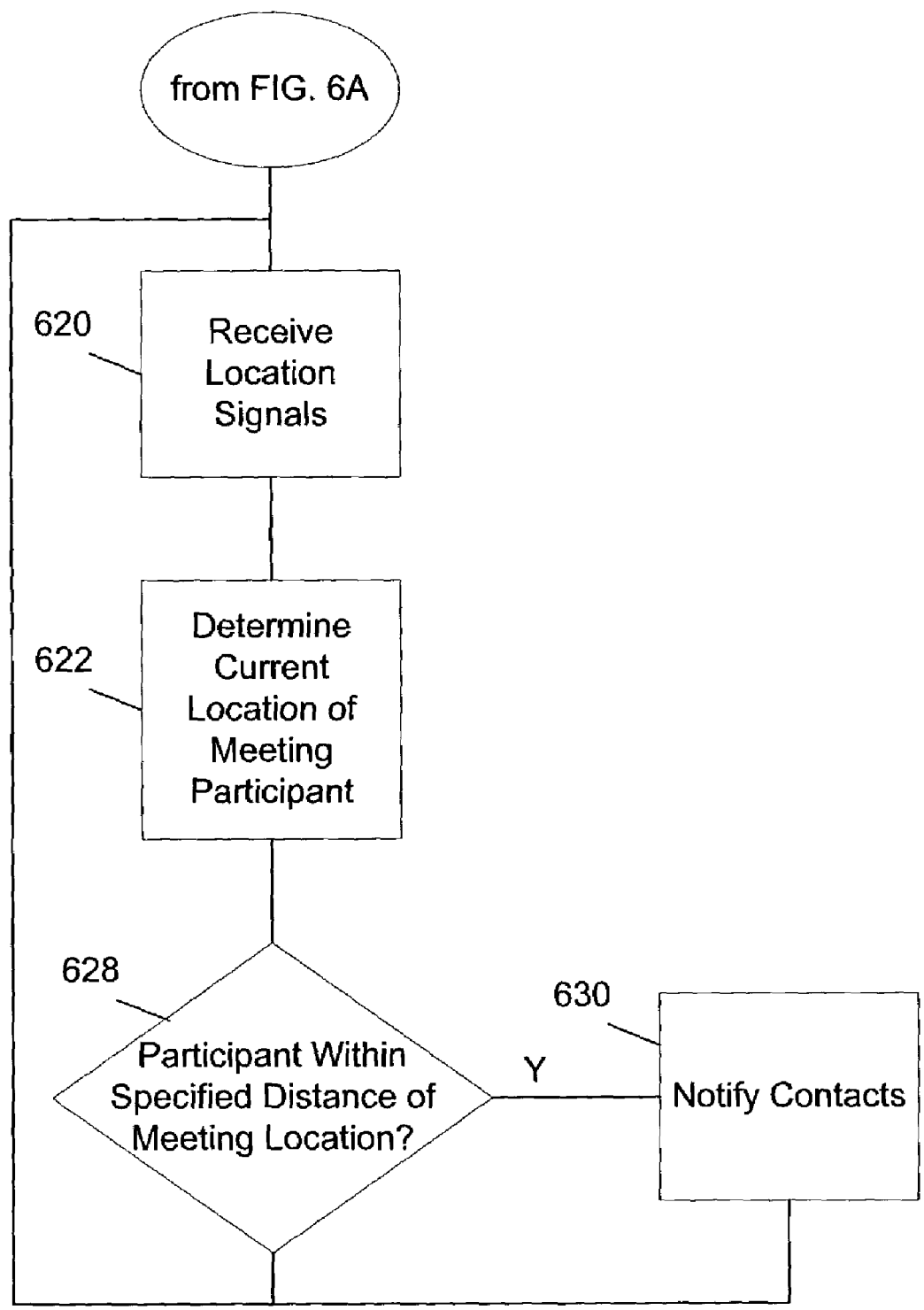

FIGS. 6A and 6B provide a flowchart of a method 600 according to the invention. At step 602, a user accesses the notification service to provide data necessary to set up a user profile in the data store. The user can access the notification service via telephone (e.g., by dialing a telephone number associated with the service), or via the Internet (e.g., by using a browser on the user's computer to connect to a web site that the notification service provides).

In a preferred embodiment of the invention, the service is implemented as a subscription service. That is, only paid subscribers can utilize the service. It should be understood, however, that the service could also be implemented such that a subscription is unnecessary. If the service is implemented as a subscription service, then, at step 604, the service determines whether the user is a subscriber to the service. Otherwise, the service skips to step 612.

Preferably, the service includes a data store that contains a respective account ID and a user signature for each subscriber. A user signature can include, for example, a user ID/password combination associated with the respective subscriber. The account ID can be, for example, a unique alphanumeric identifier that the service assigns to the respective subscriber's account. At step 604, the service invites the user to input a user signature, and determines whether the user is a subscriber by determining whether the input signature is in the data store. Preferably, the service also provides a mechanism by which the user can change his/her signature (e.g., by changing his/her password), and by which the user can provide a friendly name associated with him/herself.

If, at step 604, the notification service determines that the user is not a subscriber (e.g., if the input user signature is not in the data store), then, at step 606, the service provides a user interface via which the user can subscribe to the service. For example, if the service is implemented as a telephone based service, the service can invite the user to subscribe by providing an audio message such as "If you wish to subscribe to this service, please press or say '1.'" The service can then prompt the user to set up an account (e.g., input a signature, friendly name, and preferred payment information) using the telephone keypad or transceiver. Similarly, if the service is implemented as a web-based service, the service can invite the user to subscribe by providing a window (or a link to a subscription web page) that enables the user to set up an account.

At step 608 the service determines whether the user has elected to subscribe. If, at step 608, the service determines that the user has not elected to subscribe (e.g., the user cancels the transaction or does not input the requested data within a certain timeout period), then, at step 610, the service terminates access (by disconnecting the telephone call or providing an error message on the web page, for example).

If the service determines that the user is a subscriber, or if the service is not implemented as a subscription service, then, at step 612, the service begins to request from the user certain data that will enable the service to determine whether a specified party has arrived at a specified location. (If the service is not implemented as a subscription service, then the service can invite a first-time user to set up an account by entering a user signature and friendly name.)

At step 612, the services invites the user to enter a respective identifier associated with each of one or more meeting participants. The user can input a meeting participant ID and familiar name, for example, for each meeting participant. The meeting participant ID can include an alphanumeric string that is stored in an entry in the contacts table that is associated with the user. In order for the service to associate the meeting participant with the received location signals, it is preferred that the meeting participant ID is associated with the location device that the meeting participant is wearing. Accordingly, location signals from the location device can include a device ID that corresponds to the meeting participant ID of the party wearing the device.

At step 614, the service invites the user to input location data associated with the meeting location. The service receives the location data from the user, and stores the location data in the user's entry in the contacts table. Preferably, the user enters a street address that corresponds to the meeting location. The system converts the user entered street address into a set of longitudes and latitudes that define the boundaries of the meeting location, and stores the set of longitudes and latitudes in the contacts table. Alternatively, the location data can be stored as a single longitude/latitude pair.

At step 616, the service invites the user to input distance data associated with the meeting location. The distance data represents the distance that a meeting participant may be from the meeting location in order to trigger the service's notifying the contacts associated with the user. Respective distance data may be specified for each meeting participant, or one distance may be specified for all the meeting participants in a set. The service stores the distance data in the user's entry in the contacts table. Preferably, any suitable units for distance can be used.

At step 618, the service invites the user to input contacts data associated with one or more contacts that the user would like to be notified when the meeting participant is within the specified distance from the meeting location. Contacts can include the user/subscriber and any number of third parties that the user would like to notify when the meeting participant is within the specified distance from the meeting location.

For each contact that the user specifies, the user can input a communications pathway to that contact. For example, the user may wish to be notified via his mobile telephone. Accordingly, the user can provide his mobile telephone number and an indication that the notification should include an audio message. Alternatively or additionally, the user can specify an email address, for example, along with an indication that the notification should include a text message. Similarly, the user can set up his account to trigger a telephone call to one or more third parties, a pager, PDA, or any other communications device that can receive a notification that includes a text or audio message.

As depicted in FIG. 5, if Fred, Wilma, or Betty gets within 10 miles of the meeting location specified by "Long, Lat," Barney is notified via his pager and email. If Betty arrives at the meeting location at "123 Main Street," Fred, Wilma, and Barney are all notified via their respective PDAs.

After the user account is set up, the service begins monitoring, at step 620, by receiving respective location signals emitted by the meeting participants' location devices. At step 622, the service determines the current locations of the meeting participants. In an embodiment wherein the meeting participant's location device includes a GPS receiver, the device can transmit location signals that include an identifier associated with the meeting participant (such as an identifier associated with the meeting participant's location device, for example), and the longitude and latitude associated with the meeting participant's current location. In such an embodiment, the service can extract the participant ID and longitude and latitude data from the location signals. In an embodiment wherein the meeting participant's location device is a simplex transmitter, the service can calculate the longitude and latitude from the signals.

At step 628, for each of the one or more meeting participants specified in the user's entry in the contacts table, the service determines whether the meeting participant is within the specified distance from the meeting location. Using the longitude and latitude of the current location of the meeting participant, and the longitude(s) and latitude(s) associated with the meeting location, the service computes the current distance between the meeting participant and the meeting location. If the current distance between the meeting participant and the meeting location is less than the specified distance associated with the meeting location (which may be zero), then the service concludes that meeting participant is within the specified distance from the meeting location.

If, at step 628, the service determines that the meeting participant is within the specified distance from the meeting location, then, at step 630, the service notifies the contacts in the user's entry in the contacts table. Each contact is notified via the communications pathway associated with that contact in the contacts table. For example, if the communications pathway is the user's mobile telephone, the service can automatically place a telephone call to the user's mobile telephone number, and provide an audio message such as "Barney, This is the Notification Service. Fred is within 10 miles of the meeting location." If the communications pathway is an email address, for example, the service can dispatch an email notification that includes a text message such as "On [date], at [time], Betty arrived at the meeting being held at 123 Main Street."

After notifying the contact or, if the service determines at step 628 that none of the meeting participants is within the specified distance from the meeting location, the service returns to step 620 and continues monitoring.

Thus, there have been described systems and methods for notifying a user that one or more meeting participants is within a specified distance of a specified meeting location. Those skilled in the art will appreciate that numerous changes and modifications can be made to the preferred embodiments of the invention, and that such changes and modifications can be made without departing from the spirit of the invention. It is intended, therefore, that the appended claims cover all such equivalent variations as fall within the true spirit and scope of the invention.

What is claimed is:

1. A system for providing notification of a location of a meeting participant, the system comprising:
   receiving means for receiving a location signal that represents a current location of a specified meeting participant;
   a data store that contains meeting location data that represents a meeting location, and distance data that represents a specified distance from the meeting location, the meeting location data and the distance data being provided by a user of the system, the user being different than the meeting participant, the data store including a plurality of contacts associated with each meeting participant and communication pathways associated with each contact; and transmission means for transmitting a notification message to the plurality of contacts via the communication pathways if the current location of the meeting participant is within the specified distance from the meeting location.

2. The system of claim 1, further comprising:

determination means for determining from the location signal, the meeting location data, and the distance data whether the current location of the meeting participant is within the specified distance from the meeting location.

3. The system of claim 1, wherein the communication pathways including a phone number for an audio notification message and a network address for a text message.

4. The system of claim 1, further comprising:

a location signal device that is adapted to be worn or carried by the meeting participant and to transmit the location signal.

5. The system of claim 4, wherein the location signal device comprises a global positioning system signal receiver that is adapted to receive global positioning signals from each of a plurality of global positions system satellites.

6. The system of claim 5, wherein the location signal includes the global positioning signals.

7. The system of claim 1, further comprising:

a user interface via which a user can provide at least one of the meeting location data and the distance data.

8. The system of claim 3, further comprising:

a user interface via which the user can provide the data that represents the communication pathway.

9. The system of claim 1, further comprising:

means for determining the current location of the meeting participant from the location signal.

10. The system of claim 1, further comprising:

receiving means for receiving a second location signal that represents a current location of a second meeting participant;

determination means for determining from the second location signal, the meeting location data, and the distance data whether the current location of the second meeting participant is within the specified distance from the meeting location; and transmission means for transmitting a notification message to the user of the system if the current location of the second meeting participant is within the specified distance from the meeting location.

11. The system of claim 10, further comprising:

a data store that contains second distance data that represents a second specified distance from the meeting location;

determination means for determining from the second location signal, the meeting location data, and the second distance data whether the current location of the second meeting participant is within the second specified distance from the meeting location; and transmission means for transmitting a notification message if the current location of the second meeting participant is within the second specified distance from the meeting location.

12. A system for providing notification of a location of a meeting participant, the system comprising:

means for determining whether any of a plurality of meeting participants specified by a user of the system is within a respective specified distance of a meeting location;

means for storing meeting location data that represents the meeting location, and distance data that represents the specified distance from the meeting location, the meeting location data and the distance data being provided by a user of the system, the user being different than the meeting participant the data store including a plurality of contacts associated with each meeting participant and communication pathways associated with each contact; and means for notifying the plurality of contacts via the communication pathways if any of the specified meeting participants is within the respective specified distance of the meeting location, the user being different than the meeting participant.

13. A method for providing notification of a location of a meeting participant, the method comprising:

receiving a location signal that represents a current location of a meeting participant specified by a user;

storing meeting location data that represents a meeting location, and distance data that represents a specified distance from the meeting location, wherein the location data and distance data are provided by a user;

storing a plurality of contacts associated with each meeting participant and communication pathways associated with each contact;

determining from the location signal, the meeting location data, and the distance data whether the current location of the meeting participant is within the specified distance from the meeting location; and transmitting a notification message to the plurality of contacts via the communication pathways if the current location of the meeting participant is within the specified distance from the meeting location, the user being different than the meeting participant.

14. A method for providing notification of a location of a meeting participant, the method comprising:

receiving a respective location signal that represents a respective current location of each of a plurality of meeting participants specified by a user;

storing meeting location data that represents a meeting location, and distance data that represents a specified distance from the meeting location;

storing a plurality of contacts associated with each meeting participant and communication pathways associated with each contact;

determining from the respective location signals, the meeting location data, and the distance data whether the respective current location of any of the meeting participants is within the specified distance from the meeting location; and transmitting a notification message to the plurality of contacts via the communication pathways if the respective current location of any of the meeting participants is within the specified distance from the meeting location, the user being different than the meeting participant.

* * * * *